US011320547B1

(12) United States Patent
Zhang et al.

(10) Patent No.: US 11,320,547 B1
(45) Date of Patent: May 3, 2022

(54) DEVICE AND METHOD FOR DETECTING ELECTRON BEAM

(71) Applicants: Tsinghua University, Beijing (CN); HON HAI PRECISION INDUSTRY CO., LTD., New Taipei (TW)

(72) Inventors: Ke Zhang, Beijing (CN); Guo Chen, Beijing (CN); Peng Liu, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/225,696

(22) Filed: Apr. 8, 2021

(30) Foreign Application Priority Data

Dec. 17, 2020 (CN) ......................... 202011497817.6

(51) Int. Cl.
*G01J 1/42* (2006.01)
*G01T 7/00* (2006.01)

(52) U.S. Cl.
CPC ..................................... *G01T 7/00* (2013.01)

(58) Field of Classification Search
CPC ........................................................ G01T 7/00
See application file for complete search history.

(56) References Cited

U.S. PATENT DOCUMENTS

2003/0127594 A1 7/2003 Schneiker
2005/0156124 A1* 7/2005 Tobimatsu ............ G01N 21/51 250/573
2015/0368105 A1 12/2015 Wei et al.

FOREIGN PATENT DOCUMENTS

CN 112011232 12/2020
JP H1012180 A * 1/1998
TW 201609528 3/2016

* cited by examiner

*Primary Examiner* — Kiho Kim
(74) *Attorney, Agent, or Firm* — ScienBiziP, P.C.

(57) ABSTRACT

An device for detecting electron beam comprises a porous carbon material layer, a Faraday cup and an image display. The porous carbon material layer comprises a plurality of carbon material particles and a first through hole. A plurality of micro gaps exist between the plurality of carbon material particles. A cross-sectional area of the first through hole is less than or equal to a cross-sectional area of the electron beam. The Faraday cup is under the porous carbon material layer and comprises an opening. The opening and the first through hole penetrate with each other. The image display is electrically connected to the porous carbon material layer and configured to form an image with different colors according to charge generated in the porous carbon material layer. A method for detecting electron beam using the device for detecting electron beam is also provided.

20 Claims, 7 Drawing Sheets providing the electron beam detection device 10 — S1 moving an electron beam to be measured relative to the porous carbon material layer 102 — S2 observing an image obtained in the image display 104, and obtaining an image of the electron beam to be measured according to a color of the image obtained in the image display — S3

DEVICE AND METHOD FOR DETECTING ELECTRON BEAM

CROSS-REFERENCE TO RELATED APPLICATIONS

This application claims all benefits accruing under 35 U.S.C. § 119 from China Patent Application No. 202011497817.6, filed on Dec. 17, 2020, in the China Intellectual Property Office, the contents of which are hereby incorporated by reference. The application is also related to copending applications entitled, "ELECTRONIC BLACKBODY CAVITY AND SECONDARY ELECTRON DETECTION DEVICE USING THE SAME", filed on Apr. 8, 2021; "SECONDARY ELECTRON PROBE AND SECONDARY ELECTRON DETECTOR", filed on Apr. 8, 2021; "METHOD FOR MAKING ELECTRONIC BLACKBODY STRUCTURE AND ELECTRONIC BLACKBODY STRUCTURE", filed on Apr. 8, 2021; "ELECTRONIC BLACKBODY MATERIAL AND ELECTRON DETECTOR", filed on Apr. 8, 2021; and "DEVICE AND METHOD FOR MEASURING ELECTRON BEAM", filed on Apr. 8, 2021.

FIELD

The present disclosure relates to a device and method for detecting electron beam, in particular to a device and method for detecting electron beam comprising a porous carbon material layer.

BACKGROUND

Electrons are accelerated by a force in an electric field, and energy of the electrons is increased. The electrons can be combined into a beam in a vacuum to produce an electron beam. Electron beam technology has been widely used in fields such as manufacturing and refining of high-temperature alloys, welding of high-temperature alloys, surface modification and coating preparation. Electron beam technology is also involved in fields such as aerospace, defense and military industry, and nuclear industry. In the prior art, a shape and a radius of a cross section of the electron beam need to be detected to draw an image of the electron beam.

However, conventional devices and methods for detecting electron beam have low accuracy and complex structure. There is a need to provide a device and method for detecting electron beam with simple operation and high accuracy.

BRIEF DESCRIPTION OF THE DRAWINGS

Implementations of the present technology will now be described, by way of example only, with reference to the attached figures, wherein.

DETAILED DESCRIPTION

Figure 1:
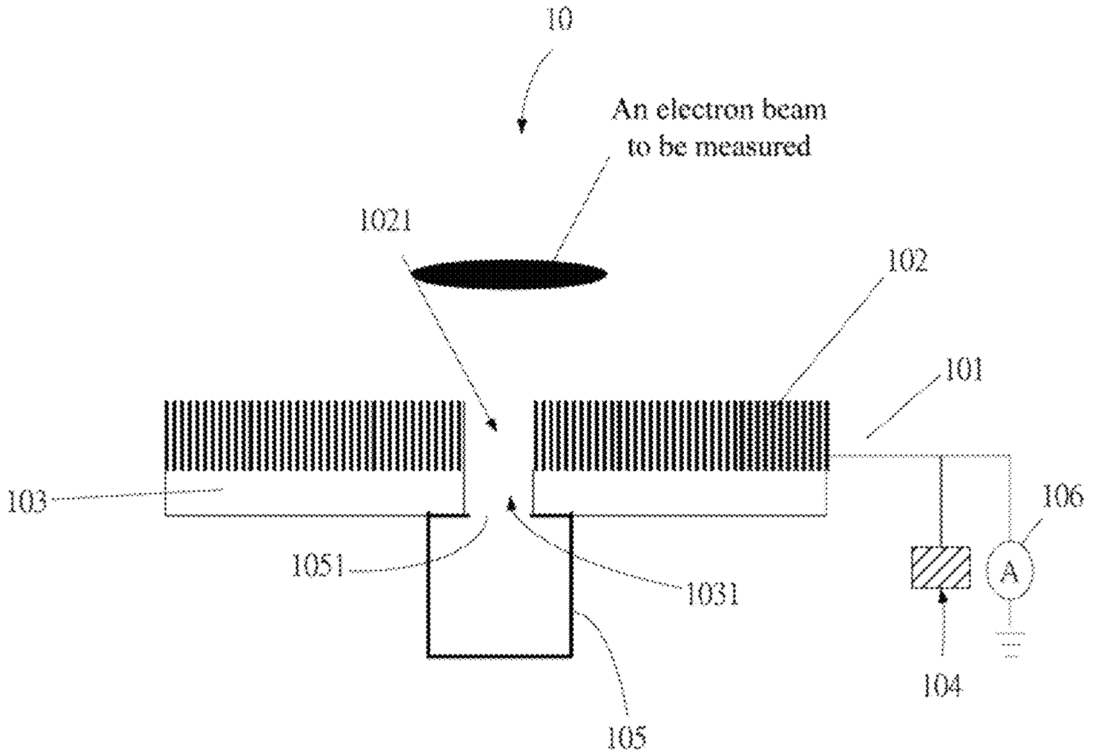
FIG. 1 is a structure schematic diagram of one embodiment of a device for detecting electron beam.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Figure 2:
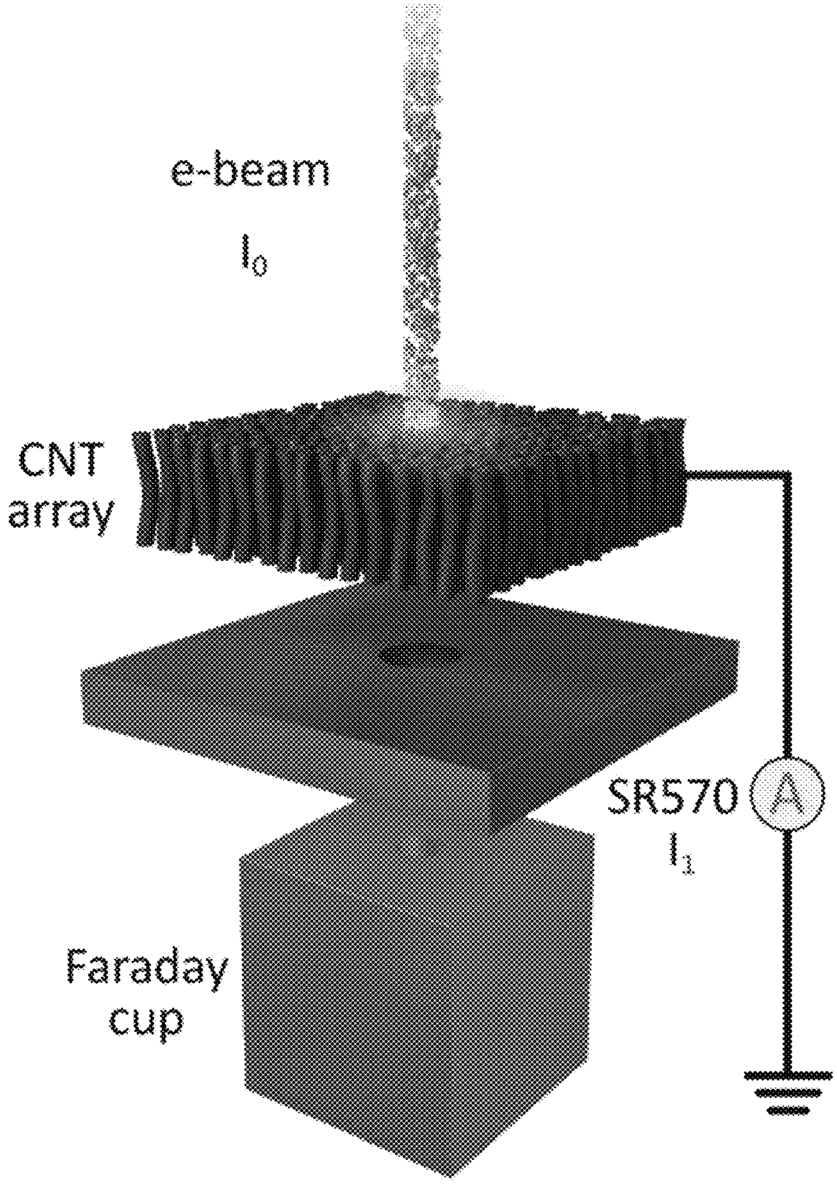
FIG. 2 is a split structure schematic diagram of the device for detecting electron beam.

Referring to FIG. 1 and FIG. 2, one embodiment is described in relation to a device 10 for detecting electron beam. The device 10 comprises a porous carbon material layer 102, a substrate 103, an image display 104 and a Faraday cup 105. The image display 104 is electrically connected to the porous carbon material layer 102.

The porous carbon material layer 102 comprises a first through hole 1021, and a cross-sectional area of the first through hole 1021 is less than or equal to a cross-sectional area of an electron beam to be measured. The first through hole 1021 extends through in a thickness direction of the porous carbon material layer 102. The substrate 103 comprises a second through hole 1031. The Faraday cup 105 comprises an opening 1051. The porous carbon material layer 102 is located on a surface of the substrate 103. The first through hole 1021, the second through hole 1031 and the opening 1051 penetrate with each other. The Faraday cup 105 is located under the substrate 103, and the Faraday cup 105 is used to collect electrons of the electron beam to be measured after passing through the first through hole 1021, the second through hole 1031 and the opening 1051.

The porous carbon material layer 102 comprises a plurality of carbon material particles, and there are a plurality of micro gaps between the plurality of carbon material particles. A size of each micro gap of the plurality of micro gaps is in nanoscale or microscale. The term "nanoscale"

means that the size of each of the plurality of micro gaps is less than or equal to 1000 nanometers, and the term "microscale" means that the size of each of the plurality of micro gaps is less than or equal to 1000 micrometers. In some embodiments, the term "nanoscale" means that the size of each of the plurality of micro gaps is less than or equal to 100 nanometers, and the term "microscale" means that the size of each of the plurality of micro gaps is less than or equal to 100 micrometers. A plurality of microporous can be formed by the plurality of micro gaps between the carbon material particles in the porous carbon material layer 102. In one embodiment, a diameter of an aperture of each microporous of the plurality of microporous ranges from about 5 micrometers to about 50 micrometers. In one embodiment, the diameter of the aperture of each microporous of the plurality of microporous ranges from about 5 micrometers to about 30 micrometers.

In one embodiment, the porous carbon material layer 102 is a pure carbon structure, the pure carbon structure means that the porous carbon material layer 102 only consists of a plurality of carbon material particles without other impurities; and the plurality of carbon material particles are also pure carbon material particles, and a material of the pure carbon material particles only consists of carbon atoms. The "pure carbon material particles" means that a range of a purity of the plurality of carbon material particles is more than 99.99%.

A shape of each carbon material particle of the plurality of carbon material particles can be linear or spherical. The plurality of carbon material particles comprise one or two of linear particles and spherical particles. A maximum diameter of a cross section of each of the linear particles is less than or equal to 1000 micrometers. The linear particles can be carbon fibers, carbon micron-wires, carbon nanotubes, and the like. A maximum diameter of each of the spherical particles is less than or equal to 1000 micrometers. The spherical particles can be carbon nanospheres, carbon microspheres, and the like. In one embodiment, the plurality of carbon material particles are a plurality of carbon nanotubes, and the porous carbon material layer 102 is a carbon nanotube structure. In one embodiment, the carbon nanotube structure is a pure carbon nanotube structure, the pure carbon nanotube structure means that the carbon nanotube structure only consists of carbon nanotubes without other impurities, and the carbon nanotubes are also pure carbon nanotubes. The carbon nanotube structure is a carbon nanotube array or a carbon nanotube network structure.

In one embodiment, the carbon nanotube structure is the carbon nanotube array, and the carbon nanotube array is located on the substrate 103. There is a crossing angle between an extending direction of the carbon nanotubes of the carbon nanotube array and the substrate 103. The crossing angle is greater than 0 degrees and less than or equal to 90 degrees. The crossing angle is more conducive to the plurality of micro gaps in the carbon nanotube array to prevent the electrons of the electron beam to be measured emitted from the carbon nanotube array, to improve the absorption rate of the carbon nanotube array for the electron beam to be measured; and thereby improving the detection accuracy of the electron beam. In one embodiment, the carbon nanotube structure is a super-aligned carbon nanotube array, and an extending direction of carbon nanotubes of the super-aligned carbon nanotube array is perpendicular to the surface of the substrate 103.

The super-aligned carbon nanotube array comprises a plurality of carbon nanotubes extending substantially in a same direction. A minority of the plurality of carbon nanotubes in the super-aligned carbon nanotube array may be randomly aligned. However, the number of randomly aligned carbon nanotubes is very small and does not affect the overall oriented alignment of the majority of the plurality of carbon nanotubes in the super-aligned carbon nanotube array. The super-aligned carbon nanotube array is free with impurities, such as amorphous carbon or residual catalyst metal particles, etc. The plurality of carbon nanotubes of the super-aligned carbon nanotube array are joined together through van der Waals forces to form an array. A size, a thickness, and a surface area of the super-aligned carbon nanotube array can be selected according to actual needs. Examples of a method of making the super-aligned carbon nanotube array is taught by U.S. Pat. No. 8,048,256 to Feng et al. The carbon nanotube array is not limited to the super-aligned carbon nanotube array, and can also be other carbon nanotube arrays.

A plurality of meshes can be formed between carbon nanotubes in the carbon nanotube network structure, and a size of each of the plurality of meshes is in nanoscale or microscale. The carbon nanotube network structure can be but not limited to a carbon nanotube sponge, a carbon nanotube film structure, a carbon nanotube paper, or a network structure formed by woven or entangled a plurality of carbon nanotube wires.

The carbon nanotube sponge is a spongy carbon nanotube macroscopic structure formed by intertwining a plurality of carbon nanotubes, and the carbon nanotube sponge is a self-supporting porous structure.

Each of the plurality of carbon nanotube wires comprises a plurality of carbon nanotubes, and the plurality of carbon nanotubes are joined end to end through van der Waals forces to form a macroscopic wire structure. The carbon nanotube wire can be an untwisted carbon nanotube wire or a twisted carbon nanotube wire. The untwisted carbon nanotube wire comprises a plurality of carbon nanotubes substantially oriented along a length of the untwisted carbon nanotube wire. The twisted carbon nanotube wire comprises a plurality of carbon nanotubes spirally arranged along an axial direction of the twisted carbon nanotube wire. The twisted carbon nanotube wire can be formed by relatively rotating two ends of the untwisted carbon nanotube. During rotating the untwisted carbon nanotube wire, the plurality of carbon nanotubes of the untwisted carbon nanotube wire are arranged spirally along an axial direction and joined end to end by van der Waals force in an extension direction of the untwisted carbon nanotube wire, to form the twisted carbon nanotube wire.

The carbon nanotube film structure is formed by a plurality of carbon nanotube films stacked with each other; adjacent carbon nanotube films are combined by van der Waals forces, and a plurality of micro gaps between the carbon nanotubes of the carbon nanotube film structure.

The carbon nanotube film can be a drawn carbon nanotube film, a flocculated carbon nanotube film or a pressed carbon nanotube film.

The drawn carbon nanotube film includes a number of carbon nanotubes that are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals force, to form a free-standing film. The term 'free-standing' includes films that do not have to be supported by a substrate. The drawn carbon nanotube film can be formed by drawing from a carbon nanotube array. A width of the drawn carbon nanotube film relates to the carbon nanotube array from which the drawn carbon nanotube film is drawn. A thickness of the carbon nanotube drawn film can range from about 0.5 nanometers to about 100 micrometers. Examples of a drawn carbon nanotube film is taught by U.S. Pat. No. 7,992,616 to Liu et al., and US patent application US 2008/0170982 to Zhang et al. In one embodiment, the carbon nanotube film structure is formed by a plurality of drawn carbon nanotube films stacked and crossed with each other. There is a cross angle between the carbon nanotubes in the adjacent carbon nanotube drawn films, and the cross angle is greater 0 degrees and less than and equal to 90 degrees. Therefore, the carbon nanotubes in the plurality of drawn carbon nanotube films are interwoven to form a networked film structure.

The flocculated carbon nanotube film can include a number of carbon nanotubes entangled with each other. The carbon nanotubes can be substantially uniformly distributed in the flocculated carbon nanotube film. The flocculated carbon nanotube film can be formed by flocculating the carbon nanotube array. Examples of the flocculated carbon nanotube film are taught by U.S. Pat. No. 8,808,589 to Wang et al.

The pressed carbon nanotube film can include a number of disordered carbon nanotubes arranged along a same direction or along different directions. Adjacent carbon nanotubes are attracted to each other and combined by van der Waals force. A planar pressure head can be used to press the carbon nanotubes array along a direction perpendicular to the substrate, a pressed carbon nanotube film having a plurality of isotropically arranged carbon nanotubes can be obtained. A roller-shaped pressure head can be used to press the carbon nanotubes array along a fixed direction, a pressed carbon nanotube film having a plurality of carbon nanotubes aligned along the fixed direction is obtained. The roller-shaped pressure head can also be used to press the array of carbon nanotubes along different directions, a pressed carbon nanotube film having a plurality of carbon nanotubes aligned along different directions is obtained. Examples of the pressed carbon nanotube film are taught by U.S. Pat. No. 7,641,885 to Liu et al.

The carbon nanotube paper comprises a plurality of carbon nanotubes arranged substantially along a same direction, and the plurality of carbon nanotubes are joined end to end by van der Waals force in an extending direction, and the plurality of carbon nanotubes are substantially parallel to a surface of the carbon nanotube paper. Examples of the carbon nanotube paper are taught by U.S. Pat. No. 9,017,503 to Zhang et al.

The carbon nanotube structure is substantially pure, and thus a specific surface area of the plurality of carbon nanotube of the carbon nanotube structure is large. Therefore, the carbon nanotube structure has a great stickiness. In one embodiment, the carbon nanotube structure is fixed on the surface of the substrate 103 by its own great stickiness. In one embodiment, the carbon nanotube structure is fixed on the surface of the substrate 103 by an adhesive.

The higher an energy of the electron beam to be measured, the greater a penetration depth in the porous carbon material layer 102, on the contrary, the smaller the penetration depth. In one embodiment, the energy of the electron beams to be measured is less than or equal to 20 keV, and a thickness of the porous carbon material layer 102 is in a range from about 200 micrometers to about 600 micrometers. When the thickness of the porous carbon material layer 102 is in the range of 200 micrometers to 600 micrometers, the electron beam to be measured does not easily penetrate the porous carbon material layer 102 and be reflected from the porous carbon material layer 102; and the porous carbon material layer 102 has a high electron absorption rate. In one embodiment, the thickness of the porous carbon material layer 102 is in a range from 300 micrometers to about 500 micrometers. In another embodiment, the thickness of the porous carbon material layer 102 is in a range from 250 micrometers to about 400 micrometers.

Figure 3:
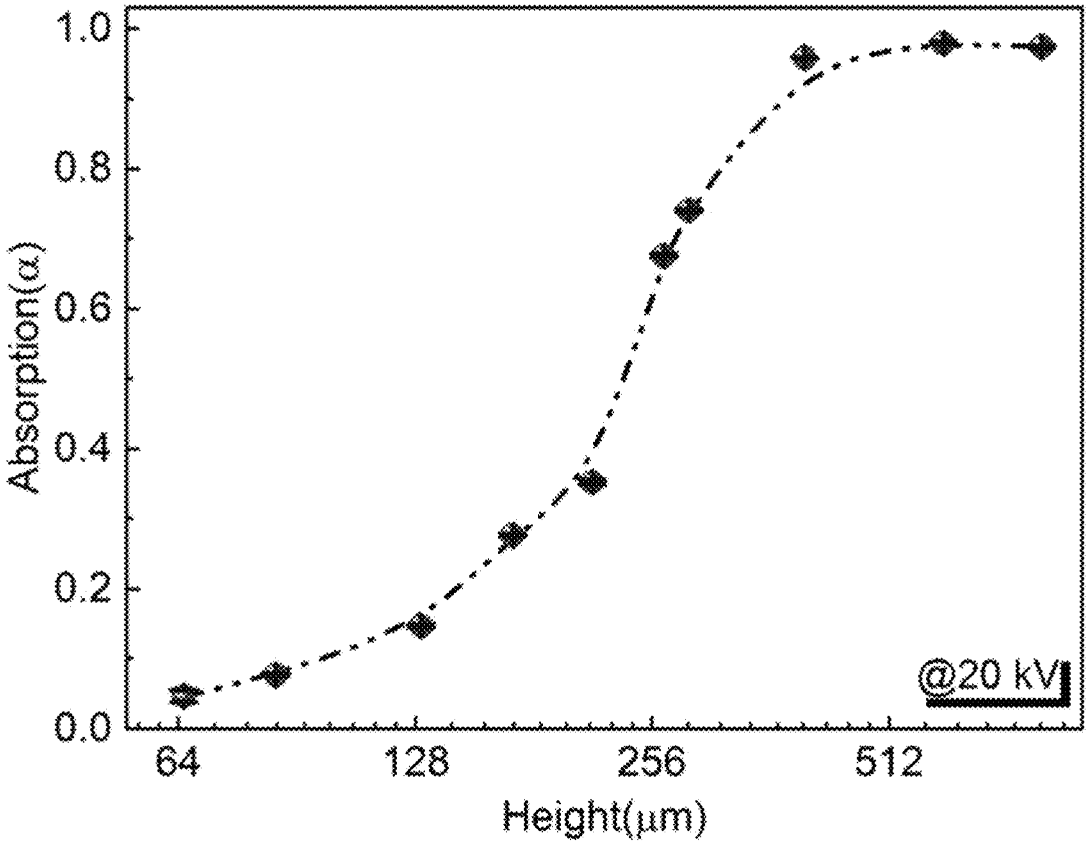
FIG. 3 is a change curve of an electron absorption rate of the device for detecting electron beam vs. a height of the super-aligned carbon nanotube array.

In one embodiment, the porous carbon material layer 102 is the super-aligned carbon nanotube array. FIG. 3 is a change curve of the electron absorption rate of the device 10 with the height of the super-aligned carbon nanotube array. It can be seen that as the height of the super-aligned carbon nanotube array increases, the electron absorption rate of the device 10 increases. When the height of the super-aligned carbon nanotube array is about 500 micrometers, the electron absorption rate of the device 10 is above 0.95 and close to 1.0. After the height of the super-aligned carbon nanotube array exceeds 540 micrometers, as the height of the super-aligned carbon nanotube array continues to increase, the electron absorption rate of the device 10 is substantially unchanged. In one embodiment, the porous carbon material layer 102 is the super-aligned carbon nanotube array, and the height of the super-aligned carbon nanotube array ranges from about 400 micrometers to about 540 micrometers.

The substrate 103 can be a flat structure. A material of the substrate 103 is an insulation material. The substrate 103 can be glass, plastic, silicon wafer, silicon dioxide wafer, quartz wafer, polymethyl methacrylate (PMMA), polyethylene terephthalate (PET), silicon, silicon with oxide layer, or quartz. A size of the substrate 103 is selected according to actual needs. In one embodiment, the porous carbon material layer 102 is a cuboid silicon substrate.

Figure 4:
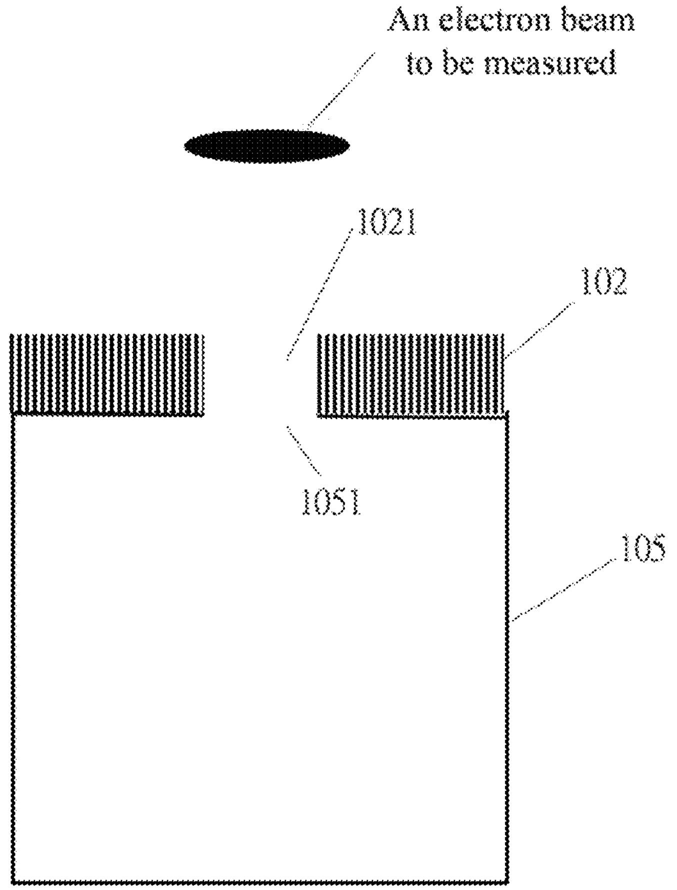
FIG. 4 is a structure schematic diagram of one embodiment of a porous carbon material layer directly located on an upper surface of a Faraday cup.

The substrate 103 can be optional. Referring to FIG. 4, in one embodiment, the device 10 excludes the substrate 103, the porous carbon material layer 102 is directly located on an upper surface of the Faraday cup 105, and the first through hole 1021 and the opening 1051 penetrate with each other.

The image display 104 is used to form an image with different colors according to an amount of charge generated in the porous carbon material layer 102, and according to the image with different colors in the image display 104, the image of the electron beam to be measured can be obtained. The image display 104 can be selected according to actual needs. In one embodiment, the image display 104 is an LCD display.

In one embodiment, the device 10 further comprises an electricity meter 106. The electric meter 106 comprises a first terminal and a second terminal, the first terminal is electrically connected to the porous carbon material layer 102, and the second terminal is grounded. The electricity meter 106 is used to test the charge generated in the porous carbon material layer 102 and perform a numerical conversion to form an electric signal. The electricity meter 106 can be but not limited to an ammeter or a voltmeter. In one embodiment, the electricity meter 106 is the ammeter, and the ammeter is used to test a current value generated by the charge in the porous carbon material layer 102.

When the device 10 is in use, the device 10 is placed in a vacuum chamber, and the electron beam to be measured is moved relative to the porous carbon material layer 102 to realize a two-dimensional scanning of the porous carbon material layer 102 by the electron beam to be measured. The two-dimensional scanning of the porous carbon material layer 102 with the electron beam to be measured can be realized by moving the electron beam to be measured, or by moving the porous carbon material layer 102, the substrate 103 and the Faraday cup 105. In one embodiment, the two-dimensional scanning of the porous carbon material layer 102 is realized by moving the electron beam to be measured. A trajectory of the electron beam to be measured is a plurality of parallel lines, such as "≡". The plurality of parallel lines can be equally spaced or unequally spaced. The trajectory of the electron beam to be measured is not limited to the plurality of parallel lines. The trajectory of the electron beam to be measured can be selected according to actual needs, as long as it can realize the two-dimensional scanning of the porous carbon material layer 102. In one embodiment, the trajectory of the electron beam to be measured is serpentine "Ƨ". In one embodiment, the electron beam to be measured moves in a first direction and a second direction respectively, and the first direction and the second direction are crossed. In one embodiment, the first direction is perpendicular to the second direction.

When detecting the electron beam to be measured, the electron beam to be measured enters the vacuum chamber, and the electron beam to be measured is moved relative to the porous carbon material layer 102 to realize the scanning of the porous carbon material layer 102 by the electron beam to be measured. When the entire electron beam to be measured irradiates on the porous carbon material layer 102, the electrons of the electron beam to be measured are refracted and reflected multiple times in the micro gaps between the plurality of carbon material particles of the porous carbon material layer 102, and the electrons of the electron beam to be measured cannot be emitted from the porous carbon material layer 102. Therefore, the electron absorption rate of the porous carbon material layer 102 can reach more than 99.99% and almost reach 100%, the porous carbon material layer 102 which can be regarded as an absolute blackbody of electrons. When the entire electron beam to be measured irradiates on the porous carbon material layer 102, all the electrons in the entire electron beam to be measured are absorbed by the porous carbon material layer 102, and the charge generated in the porous carbon material layer 102 is the most, and the image obtained by the image display 104 is also the darkest. When only a part of the electron beam to be measured irradiates on the porous carbon material layer 102, the other part of the electron beam to be measured irradiates on the first through hole 1021, the part of the electron beam to be measured irradiating on the first through hole 1021 enters the Faraday cup 105 after passing through the second through hole 1031 and the opening 1051. Compared to a situation that the entire electron beam to be measured irradiates on the porous carbon material layer 102, when a part of the electron beam to be measured irradiates on the porous carbon material layer 102, the charge generated in the porous carbon material layer 102 is reduced, and the color of the image obtained in the image display 104 become lighter. The more electron beams irradiate on the first through hole 1021, the less charge is generated in the porous carbon material layer 102. Since the cross-sectional area of the first through hole 1021 is less than or equal to the cross-sectional area of the electron beam to be measured, when the first through holes 1021 are all covered by the electron beam to be measured, the electron beam irradiating on the porous carbon material layer 102 is the least, the charge generated in the porous carbon material layer 102 is the least, and the image is the lightest. Moreover, comparing the situation that the part of the electron beam to be measured irradiates on the first through hole 1021 and the situation that the entire electron beam to be measured irradiates on the porous carbon material layer 102, a color difference in the image display 104 is obvious, and the color difference is very easy to distinguish with a naked eye. Therefore, when the electron beam to be measured performs two-dimensional scanning on the porous carbon material layer 102, a size and morphology of the electron beam to be measured can be easily obtained according to the color difference in the image display 104.

Figure 5:
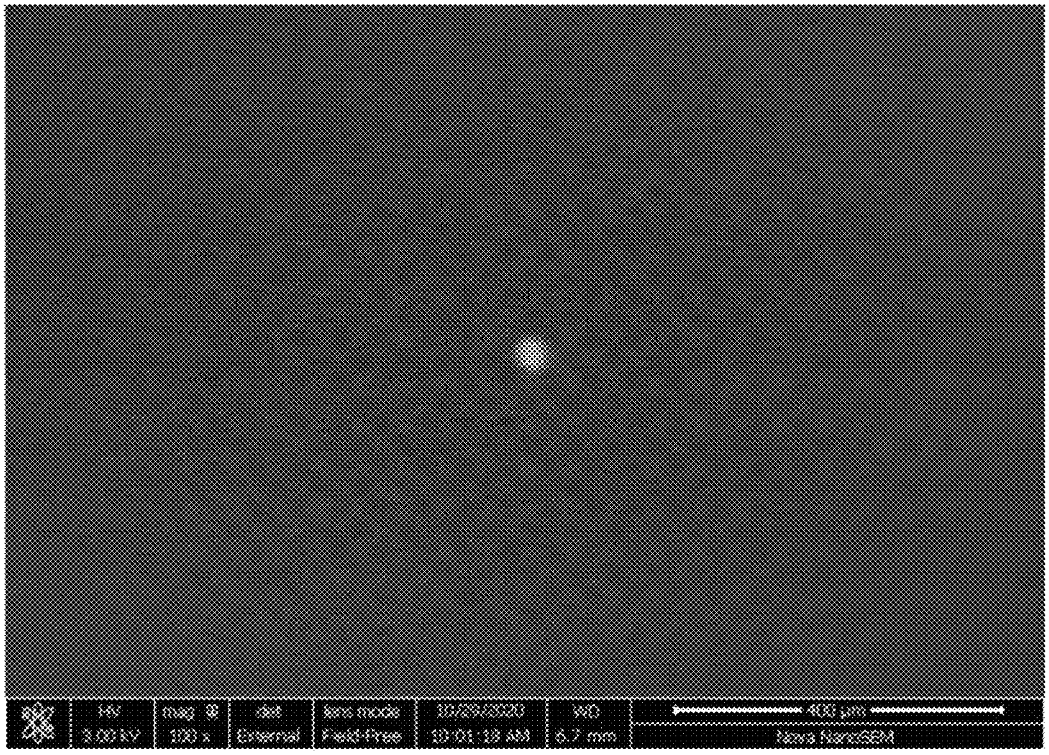
FIG. 5 is a topography image of a super-aligned carbon nanotube array.

In one embodiment, the porous carbon material layer 102 is the super-aligned carbon nanotube array, FIG. 5 is a topography image of the super-aligned carbon nanotube array, in the topography image, the lighter image in the middle is the first through hole 1021 of the super in-line carbon nanotube array, and the other darker images are the carbon nanotubes in the super in-line carbon nanotube array. According to FIG. 5, it can be obtained that a size of the first through hole 1021 in this embodiment is approximately 20 microns.

Figure 6:
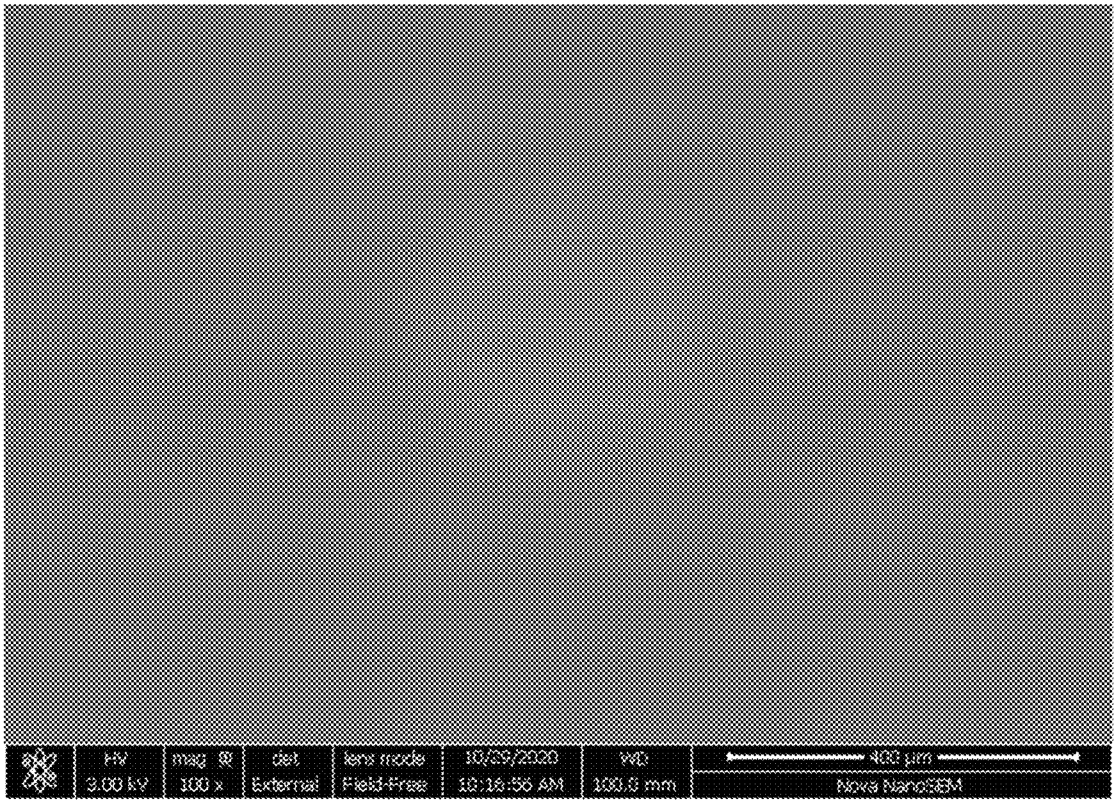
FIG. 6 is a shape image of an electron beam spot of an electron beam to be measured obtained by the electron beam detecting device in FIG. 1.

FIG. 6 is a shape image of the electron beam spot of the electron beam to be measured obtained by the device 10. It can be seen from the shape image obtained by the image display 104, the middle color is lighter, the other parts are darker, and the two colors are very different and can be easily distinguished by the naked eye. The lighter-colored image in the middle is the image of the electron beam to be measured. It can also be seen from FIG. 6 that a maximum diameter of the electron beam spot is about 300 microns.

Figure 7:
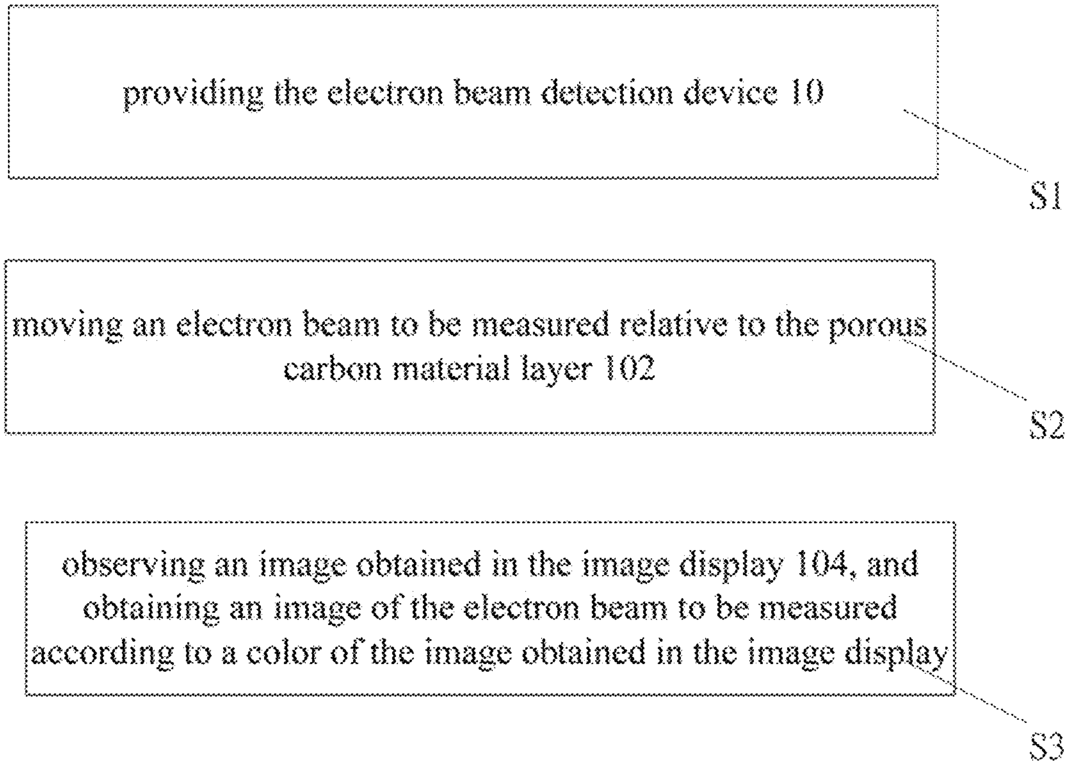
FIG. 7 is a flow chart of a method for detecting electron beam using the device for detecting electron beam in FIG. 1.

Referring to FIG. 7, one embodiment is described in relation to a method for detecting electron beam using the device 10. The method comprises the steps of:

step (S1), providing the device 10;

step (S2), moving an electron beam to be measured relative to the porous carbon material layer 102; and step (S3), observing a first image obtained in the image display 104, and obtaining a second image of the electron beam to be measured according to a color of the first image obtained in the image display 104.

In step (S2), the porous carbon material layer 102, the substrate 103 and the Faraday cup 105 of the device 10 are all placed in a vacuum chamber. The electron beam to be measured is moved relative to the porous carbon material layer 102, so as to realize the two-dimensional scanning of the porous carbon material layer 102 by the electron beam to be measured. The electron beam to be measured is moved relative to the porous carbon material layer 102 can be realized by moving the electron beam to be measured, or by moving the porous carbon material layer 102, the substrate 103 and the Faraday cup 105. In one embodiment, the two-dimensional scanning of the porous carbon material layer 102 is realized by moving the electron beam to be measured. A trajectory of the electron beam to be measured is a plurality of parallel lines "≡". The trajectory of the electron beam to be measured is not limited to the plurality of parallel lines "≡". The trajectory of the electron beam to be measured can be selected according to actual needs, as long as it can realize the two-dimensional scanning of the porous carbon material layer 102. In one embodiment, the trajectory of the electron beam to be measured is serpentine "Ƨ". In one embodiment, the electron beam to be measured moves in a first direction and a second direction respectively, and the first direction and the second direction are crossed. In one embodiment, the first direction is perpendicular to the second direction.

In step (S3), when the entire electron beam to be measured irradiates on the porous carbon material layer 102, all the electrons in the entire electron beam to be measured are absorbed by the porous carbon material layer 102, and the charge generated in the porous carbon material layer 102 is the most, and the image obtained by the image display 104 is also the darkest. When a part of the electron beam to be measured irradiates on the porous carbon material layer 102, the other part of the electron beam to be measured irradiates on the first through hole 1021, the part of the electron beam to be measured irradiating the first through hole 1021 enters the Faraday cup 105 after passing through the second through hole 1031 and the opening 1051. Compared to a situation that the entire electron beam to be measured irradiates on the porous carbon material layer 102, when a part of the electron beam to be measured irradiates on the porous carbon material layer 102, the charge generated in the porous carbon material layer 102 is reduced, and the color of the image obtained in the image display 104 become lighter. The more electron beams irradiate on the first through hole 1021, the less charge is generated in the porous carbon material layer 102. Since the cross-sectional area of the first through hole 1021 is less than or equal to the cross-sectional area of the electron beam to be measured, when the first through holes 1021 are all covered by the electron beam to be measured, the electron beam irradiating on the porous carbon material layer 102 is the least, the charge generated in the porous carbon material layer 102 is the least, and the image is the lightest. Moreover, comparing the situation that the part of the electron beam to be measured irradiates on the first through hole 1021 and the situation that the entire electron beam to be measured irradiates on the porous carbon material layer 102, a color difference in the image display 104 is obvious, and the color difference is very easy to distinguish with a naked eye. Therefore, when the electron beam to be measured performs two-dimensional scanning on the porous carbon material layer 102, a size and morphology of the electron beam to be measured can be easily obtained according to the color difference in the image display 104.

The secondary electron detection device of the present disclosure comprises the porous carbon material layer, the electron beam to be measured moves relative to the porous carbon material layer, and thus the size of the electron beam to be measured irradiating on the porous carbon material layer changes; and then the image of the electron beam to be measured can be obtained according to the image color on the image display. Therefore, a structure of the device for detecting electron beam and the method for detecting electron beam using the device for detecting electron beam are simple. Further, since the absorption rate of the porous carbon material layer for electrons can reach almost 100%, the porous carbon material layer can be regarded as an electronic blackbody, and the material of the plurality of carbon material particles comprises carbon atoms, the carbon atoms has excellent electrical conductivity; when the part of the electron beam to be measured irradiates on the porous carbon material layer and when the entire electron beam to be measured irradiates on the porous carbon material layer, a color difference in the image display is obvious, and the color difference is very easy to distinguish with a naked eye. Therefore, the detection accuracy of the device for detecting electron beam and the method for detecting electron beam is very high.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. An device for detecting electron beam comprising:

a porous carbon material layer comprising a plurality of carbon material particles and defining a first through hole, wherein a plurality of micro gaps are defined by the plurality of carbon material particles, the first through hole extending through a thickness direction of the porous carbon material layer, and a first cross-sectional area of the first through hole is less than or equal to a second cross-sectional area of an electron beam to be measured;

a Faraday cup placed under the porous carbon material layer and defining an opening, wherein the opening and the first through hole penetrate with each other; and an image display electrically connected to the porous carbon material layer, wherein the image display is configured to form a first image of different colors according to electrical charges generated in the porous carbon material layer, and to obtain a second image according to the first image of different colors.

2. The device of claim 1, wherein the porous carbon material layer consists of a plurality of pure carbon material particles, and the plurality of pure carbon material particles consist of carbon atoms.

3. The device of claim 1, wherein the plurality of carbon material particles comprise at least one of linear particles and spherical particles.

4. The device of claim 3, wherein a diameter of a cross section of each of the linear particles is less than or equal to 1000 micrometers, and a diameter of each of the spherical particles is less than or equal to 1000 micrometers.

5. The device of claim 3, wherein the linear particles are carbon fibers, carbon micron-wires, or carbon nanotubes.

6. The device of claim 3, wherein the spherical particles are carbon nanospheres or carbon microspheres.

7. The device of claim 1, wherein the porous carbon material layer is a carbon nanotube array or a carbon nanotube network structure.

8. The device of claim 7, wherein the carbon nanotube network structure is a carbon nanotube sponge, a carbon nanotube film structure, a carbon nanotube paper, or a network structure.

9. The device of claim 1, further comprising a substrate, wherein the porous carbon material layer is on a surface of the substrate, the substrate comprises a second through hole, and the first through hole, the second through hole and the opening.

10. The device of claim 9, wherein the porous carbon material layer is a super-aligned carbon nanotube array comprising a plurality of carbon nanotubes extending substantially in a same direction, and an extending direction of the plurality of carbon nanotubes is perpendicular to the surface of the substrate.

11. The device of claim 1, wherein a thickness of the porous carbon material layer is in a range from 200 micrometers to 600 micrometers.

12. The device of claim 1, wherein the porous carbon material layer is a super-aligned carbon nanotube array, and a height of the super-aligned carbon nanotube array is in a range from 350 micrometers to 600 micrometers.

13. The device of claim 1, wherein the plurality of carbon material particles is an electron blackbody, and an absorption rate of the plurality of carbon material particles to electrons is more than 99.99%.

14. The device of claim 1, wherein a size of each micro gap of the plurality of micro gaps is less than or equal to 100 micrometers.

15. The device of claim 1, further comprising an electricity meter, wherein the electric meter comprises a first terminal and a second terminal, the first terminal is electrically connected to the porous carbon material layer, and the second terminal is grounded.

16. A method for detecting electron beam comprising:

step (S1), providing an device for detecting electron beam, wherein the device for detecting electron beam comprises:

a porous carbon material layer comprising a plurality of carbon material particles and defining a first through hole, wherein a plurality of micro gaps are defined by the plurality of carbon material particles, the first through hole extending through a thickness direction of the porous carbon material layer, and a first cross-sectional area of the first through hole is less than or equal to a second cross-sectional area of an electron beam to be measured;

a Faraday cup placed under the porous carbon material layer and comprising an opening, wherein the opening and the first through hole penetrate with each other; and an image display electrically connected to the porous carbon material layer, wherein the image display is configured to form a first image of different colors according to electrical charges generated in the porous carbon material layer;

step (S2), relatively moving the electron beam to be measured to the porous carbon material layer; and step (S3), observing the first image of different colors, and obtaining a second image of the electron beam to be measured according to the first image of different colors.

17. The method of claim 16, wherein the plurality of carbon material particles are a plurality of pure carbon material particles, and the plurality of pure carbon material particles consist of carbon atoms.

18. The method of claim 16, wherein the plurality of carbon material particles is selected from carbon fibers, carbon micron-wires, carbon nanotubes, carbon nanospheres and carbon microspheres.

19. The method of claim 18, wherein the porous carbon material layer is a carbon nanotube array or a carbon nanotube network structure.

20. The method of claim 16, wherein step (S2) further comprises scanning the porous carbon material layer by moving the electron beam in at least two different directions, and a trajectory of the electron beam is a plurality of parallel lines.

* * * * *